United States Patent
Kim

(10) Patent No.: US 9,213,479 B2
(45) Date of Patent: Dec. 15, 2015

(54) METHOD AND APPARATUS FOR DISPLAYING IMAGE

(71) Applicant: SAMSUNG MEDISON CO., LTD., Gangwon-do (KR)

(72) Inventor: Kyung-dong Kim, Gangwon-do (KR)

(73) Assignee: SAMSUNG MEDISON CO., LTD., Hongcheon-Gun, Gangwon-Do (KR)

( * ) Notice: Subject to any disclaimer, the term of this patent is extended or adjusted under 35 U.S.C. 154(b) by 53 days.

(21) Appl. No.: 13/732,144

(22) Filed: Dec. 31, 2012

(65) Prior Publication Data

US 2013/0215051 A1    Aug. 22, 2013

Related U.S. Application Data

(60) Provisional application No. 61/599,740, filed on Feb. 16, 2012.

(30) Foreign Application Priority Data

May 30, 2012  (KR) .................. 10-2012-0057465

(51) Int. Cl.
| | | |
|---|---|---|
| *G06F 3/041* | (2006.01) | |
| *G06F 3/0488* | (2013.01) | |
| *G06F 3/0485* | (2013.01) | |
| *H04N 1/00* | (2006.01) | |

(52) U.S. Cl.
CPC ............ *G06F 3/0488* (2013.01); *G06F 3/0485* (2013.01); *G06F 3/04855* (2013.01); *G06F 3/04883* (2013.01); *H04N 1/0044* (2013.01)

(58) Field of Classification Search
USPC .......................... 345/173, 174, 474, 184, 629
See application file for complete search history.

(56) References Cited

U.S. PATENT DOCUMENTS

| 7,643,706 | B2 | 1/2010 | Wagner et al. |
| 7,752,573 | B2 | 7/2010 | Shiba et al. |
| 8,373,788 | B2* | 2/2013 | Ozawa et al. ............ 348/333.05 |
| 2004/0189687 | A1 | 9/2004 | Yamamoto |
| 2005/0034084 | A1 | 2/2005 | Ohtsuki et al. |
| 2006/0125799 | A1* | 6/2006 | Hillis ...................... G06F 3/011 345/173 |
| 2008/0259046 | A1* | 10/2008 | Carsanaro ............... G06F 3/016 345/173 |
| 2008/0295019 | A1 | 11/2008 | Han et al. |
| 2008/0297483 | A1* | 12/2008 | Kim et al. ..................... 345/173 |

(Continued)

FOREIGN PATENT DOCUMENTS

| EP | 2182455 A2 | 5/2010 |
| JP | 2004-0295231 A | 10/2004 |

(Continued)

OTHER PUBLICATIONS

Korean Office Action issued in Korean Application No. 10-2012-57465, dated Jan. 24, 2014. w/English translation.
Korean Office Action issued in Korean Application No. 10-2012-57465, dated Mar. 14, 2014. w/English translation.
Korean Office Action, w/ English translation thereof, issued in Korean Patent Application No. KR 10-2012-0057465 dated Jul. 22, 2013.
Extended European Search Report issued in Application No. 13150027.4 dated Jun. 10, 2015.

*Primary Examiner* — Thuy Pardo
(74) *Attorney, Agent, or Firm* — McDermott Will & Emery LLP

(57) ABSTRACT

A method of displaying an image on a touch screen, the method including: displaying a first image to which time information is matched; receiving a touch input on a region displaying the first image; changing the time information matched to the first image, based on a direction of the touch input; and displaying a second image matching the changed time information.

23 Claims, 6 Drawing Sheets

(56) References Cited

U.S. PATENT DOCUMENTS

| | | | |
|---|---|---|---|
| 2008/0309630 A1* | 12/2008 | Westerman | 345/173 |
| 2009/0267909 A1* | 10/2009 | Chen | G06F 3/04883 345/173 |
| 2010/0039446 A1* | 2/2010 | Hillis | G06F 3/011 345/629 |
| 2010/0214237 A1* | 8/2010 | Echeverri et al. | 345/173 |
| 2011/0066627 A1 | 3/2011 | Seung et al. | |
| 2011/0234504 A1 | 9/2011 | Barnett et al. | |
| 2011/0275416 A1* | 11/2011 | Chang et al. | 455/566 |
| 2011/0283188 A1 | 11/2011 | Farrenkopf et al. | |
| 2012/0044251 A1* | 2/2012 | Mark et al. | 345/474 |
| 2012/0098795 A1* | 4/2012 | Lu et al. | 345/175 |
| 2012/0154307 A1* | 6/2012 | Nunomaki | 345/173 |
| 2012/0169770 A1* | 7/2012 | Snavely | G06F 17/30274 345/629 |
| 2012/0223902 A1* | 9/2012 | Ida | 345/173 |
| 2012/0262468 A1* | 10/2012 | Ronayne | 345/548 |
| 2012/0299853 A1* | 11/2012 | Dagar | G06F 3/016 345/173 |

FOREIGN PATENT DOCUMENTS

| | | |
|---|---|---|
| JP | 2006-0302196 A | 11/2006 |
| KR | 10-2008-0101576 A | 11/2008 |
| KR | 10-2010-0049200 A | 5/2010 |

\* cited by examiner

METHOD AND APPARATUS FOR DISPLAYING IMAGE

CROSS-REFERENCE TO RELATED PATENT APPLICATION

This application claims the benefit of U.S. Provisional Application No. 61/599,740, filed on Feb. 16, 2012, in the U.S. Patents and Trademark Office, and Korean Patent Application No. 10-2012-0057465, filed on May 30, 2012, in the Korean Intellectual Property Office, the disclosure of which is incorporated herein in its entirety by reference.

BACKGROUND OF THE INVENTION

1. Field of the Invention

The present invention relates to a mobile device including a touch screen, and more particularly, to a method and apparatus for displaying a stored image.

2. Description of the Related Art

A touch screen included in a mobile device may be used both as an input unit for receiving an input from a user and an output unit for outputting data to the user. As the touch screen is used as input and output units, a space of the mobile device may be efficiently used. Furthermore, when the touch screen is used, the input of the user may be received via an intuitive and simple operation. Also, the user is able to accurately select a desired menu without any special prior knowledge, and thus the user may easily use the mobile device.

Due to the above characteristics, the touch screen is used in various mobile devices, such as a mobile phone, a personal digital assistant (PDA), a laptop computer, a tablet computer, a car navigation device, and a portable media player (PMP).

The mobile device including the touch screen has an input unit having a limited size. Thus, a user of the mobile device needs to repeat an operation a plurality of times in order to input a detailed operation, such as searching numerous images according to dates or setting a range of images to be displayed.

The detailed operation may be input by connecting a separate input unit, such as a keyboard or a mouse, to the mobile device, like a desktop computer, but such a method lacks intuition and requires the user to pre-learn it.

SUMMARY OF THE INVENTION

According to an aspect of the present invention, there is provided a method of displaying an image on a touch screen, the method including: displaying a first image to which time information is matched; receiving a touch input on a region displaying the first image; changing the time information matched to the first image, based on a direction of the touch input; and displaying a second image matching the changed time information.

The time information may include at least one of a date and a time when the first image is generated.

The method may further include determining the direction of the touch input, wherein the changing of the time information may include changing the date when the first image is generated when the direction of the touch input is determined to be a first direction, and changing the time when the first image is generated when the direction of the touch input is determined to be a second direction.

The first direction may be a left or right direction and the second direction may be an up or down direction.

The direction of the touch input may be determined based on at least one of a location of a starting point of the touch input, a location of an end point of the touch input, a direction of acceleration of the touch input, and an input pattern of the touch input.

The receiving of the touch input may include receiving at least one of a swipe input, a drag and drop input, and a flick input.

The method may further include displaying a date search bar for searching at least one image according to generated dates, wherein the date search bar may display a number of images matching each of the generated dates.

The method may further include displaying a time search bar for searching the images matching each of the generated dates according to generated times.

The method may further include displaying an image selected based on a touch input on at least one of a region where the date search bar is displayed and a region where the time search bar is displayed.

The displaying of the date search bar may include displaying a date selected based on a touch input on a region where the date search bar is displayed, by using at least one of a cursor and a number.

The method may further include expanding or reducing a date search section based on a multi-touch input on a region where the date search bar is displayed.

The method may be performed in an ultrasonic diagnostic apparatus.

According to another aspect of the present invention, there is provided an apparatus for displaying an image on a touch screen, the apparatus including: a display unit for displaying a first image to which time information is matched; an input receiving unit for receiving a touch input on a region where the first image is displayed; and an image determining unit for changing time information matched to the first image based on a direction of the touch input, wherein the display unit displays a second image matching the changed time information.

According to another aspect of the present invention, there is provided a computer-readable recording medium having recorded thereon a program for executing the method.

BRIEF DESCRIPTION OF THE DRAWINGS

The above and other features and advantages of the present invention will become more apparent by describing in detail exemplary embodiments thereof with reference to the attached drawings, wherein reference numerals denote structural elements, in which.

DETAILED DESCRIPTION OF THE INVENTION

As for the terms used herein, general terms currently widely used are selected while considering functions in the present invention, but the terms may vary according to an intention or precedent of one of ordinary skill in the art, or the advent of new technology. Also in some cases, an applicant may have arbitrarily selected a term that may be described in detail in the detailed description of the invention. Accordingly, the terms used herein should be defined based on the meaning and descriptions throughout the present invention, and not simply based on the term itself.

When an element is "included", another element may be further included unless specifically described otherwise. Also, the terms "unit" and "module" used herein mean a unit of processing at least one function or operation, which may be realized in hardware, software, or a combination of hardware and software.

As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the present invention will now be described in detail with reference to the accompanying drawings.

Figure 1:
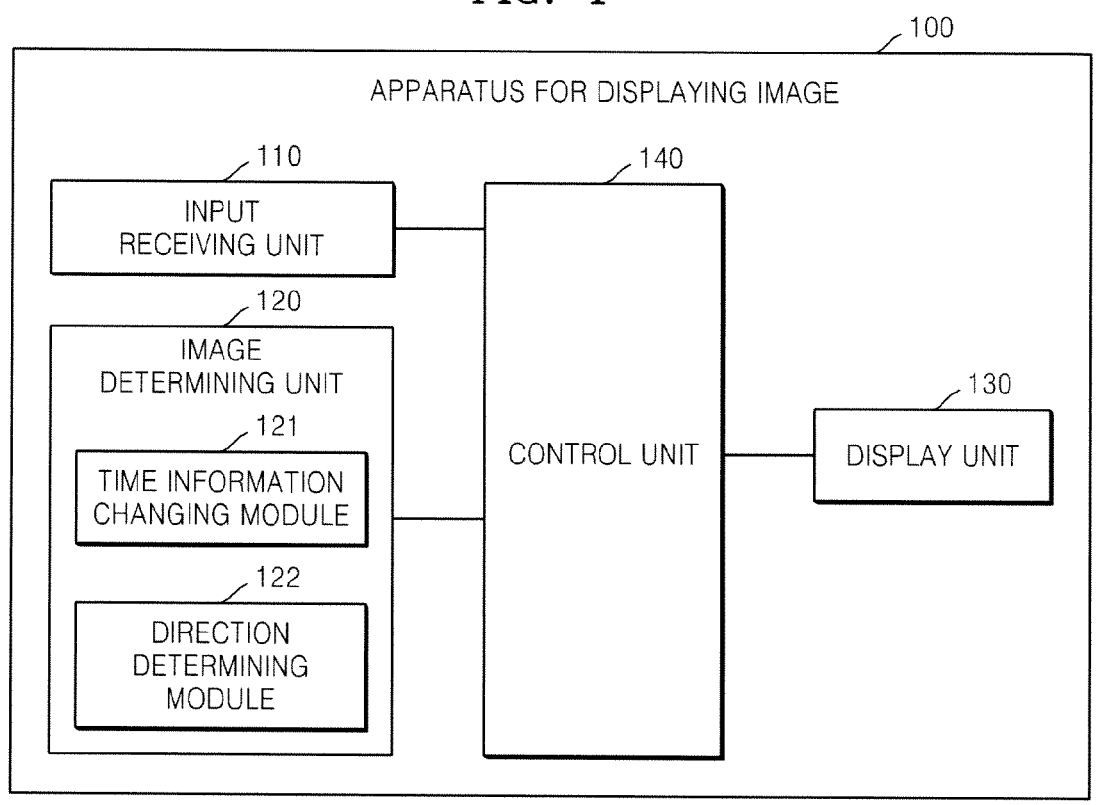
FIG. 1 is a block diagram of an apparatus for displaying an image, according to an embodiment of the present invention.

FIG. 1 is a block diagram of an apparatus 100 for displaying an image, according to an embodiment of the present invention. The apparatus 100 according to the current embodiment may include an input receiving unit 110, an image determining unit 120, a display unit 130, and a control unit 140. The apparatus 100 may further include other elements as well as those shown in FIG. 1.

The apparatus 100 displays an image on a touch screen of the apparatus 100. The apparatus 100 may be any one of a mobile phone, a personal digital assistant (FDA), a laptop computer, a tablet computer, a car navigation device, and a portable media player (PMP). However, the examples of the apparatus 100 are not limited thereto, and it would be obvious to one of ordinary skill in the art that the apparatus 100 may be any type of apparatus including a touch screen.

Also, the apparatus 100 may connect to another apparatus wirelessly or by wire. In other words, the apparatus 100 may receive an image wirelessly or by wire from another apparatus that generated the image.

According to an embodiment, the apparatus 100 may directly generate an image. In other words, the apparatus 100 may directly generate an image by photographing an object via a photographing unit (not shown), The apparatus 100 may match a plurality of images with time information and store the images. In other words, the apparatus 100 may store a plurality of images by matching the images to dates and times when the images are generated. Also, the apparatus 100 may match and store a plurality of images with dates and times received from an external apparatus.

According to an embodiment, the apparatus 100 may receive a plurality of images wirelessly or by wire and store the plurality of images. In other words, the apparatus may store images received wirelessly or by wire from another apparatus. In this case, the apparatus 100 may receive time information about a date and time when an image is captured from the other apparatus in a metadata form, together with the image, and store the time information and the image.

According to another embodiment, the apparatus 100 may store an image directly generated by the apparatus 100. When the apparatus 100 directly generates an image by using the photographing unit, the apparatus 100 may generate time information about a time and date when the image is captured in a metadata form. In this case, the apparatus 100 may store the image and the time information after matching the time information with the image.

The image may be stored in a storage unit (not shown) included in the apparatus 100. The storage unit may store the image and the time information matching each other. The time information may include at least one of a time and a date when the image is generated.

The input receiving unit 110 receives an external input for controlling the apparatus 100 from outside the apparatus 100. The received external input may be a touch input received from a user. The input receiving unit 110 may receive an external input as the user touches the input receiving unit 110 by using a part of his or her body. Alternatively, the input receiving unit 110 may receive the external input via an input tool, such as a stylus pen.

According to an embodiment, the input receiving unit 110 may have a layered structure with the touch screen of the apparatus 100. In other words, the touch screen of the apparatus 100 may be the input receiving unit 110 receiving the external input as well as an output unit displaying an image. Here, the input receiving unit 110 may receive a location, area, and pressure of a touch input, and may not only receive a real-touch but also a proximity touch. Also, the input receiving unit 110 may receive both a resistive touch and a capacitive touch.

According to an embodiment, the input receiving unit 110 may receive a touch input in a region where an image is displayed on the touch screen. For example, the input receiving unit 110 may receive at least one of a swipe input, a drag and drop input, and a flick input.

According to an embodiment, the input receiving unit 110 may receive a touch input in a region where a date search bar is displayed on the touch screen, or a region where a time search bar is displayed on the touch screen. Also, the input receiving unit 110 may receive not only a touch input, but also a multi-touch input selecting at least two locations. In other words, the input receiving unit 110 may receive an input wherein at least two points are simultaneously touched.

For example, the input receiving unit 110 may receive a pinch input or an unpinch input, wherein two points are selected and moved in the date search bar displayed on the touch screen. The pinch and unpinch inputs may denote an input of moving two arbitrary points on the touch screen respectively to two new points. Alternatively, the pinch and unpinch inputs may denote an input of moving only one point from among two arbitrary points on the touch screen to a new point.

According to another embodiment, the input receiving unit 110 may receive a touch and drag input on the date search bar displayed on the touch screen. The touch and drag input is similar to the touch input described above, but is classified from the touch input because in the touch and drag input, an arbitrary point on the touch screen is touched for at least a predetermined time to select the arbitrary point as a starting point.

According to another embodiment, the input receiving unit 110 may receive the external input by using any one of various types of sensors, instead of the touch screen. In other words, the input receiving unit 110 may receive the external input by using a gyroscope sensor detecting angular velocity. In the current embodiment, the input receiving unit 110 may receive the external input as the user tilts the apparatus 100 left, right, up, or down.

The image determining unit 120 determines an image to be displayed based on a direction of the touch input received by the input receiving unit 110. In other words, the image determining unit 120 may determine time information matching the image to be displayed on the touch screen. Also, the image determining unit 120 may change time information matching a first image being displayed, based on a touch input.

According to an embodiment, the image determining unit 120 may include a time information changing module 121 for changing time information of a displayed image, and a direction determining module 122 for determining a direction of a touch input.

The time information changing module 121 may change time information of a displayed image. In other words, the time information changing module 121 may change the time information of the first image being displayed on the touch screen to time information matching a second image to be displayed. According to an embodiment, the time information changing module 121 may change the time information based on a direction of the touch input received from the input receiving unit 110.

The direction determining module 122 determines the direction of the touch input received from the input receiving unit 110. The direction of the touch input may be determined to be a first or second direction, wherein the first direction may be a left or right direction, and the second direction may be an up or down direction.

According to an embodiment, the direction determining module 122 may determine the direction of the touch input based on at least one of a location of a starting point, a location of an end point, a direction of acceleration, and an input pattern of the touch input received from the input receiving unit 110, which will be described in detail below with reference to FIG. 5.

As such, when the direction determining module 122 determines the direction of the touch input to be the first direction, the time information changing module 121 may change a date when the first image is generated from the time information of the first image. Alternatively, when the direction of the touch input is determined to be the second direction, the time information changing module 121 may change a time when the first image is generated from the time information of the first image.

The display unit 130 displays an image matching time information. In other words, the display unit 130 may display an image determined by the image determining unit 120 using time information matching the image, on the touch screen. Alternatively, the display unit 130 may display an image matching time information determined based on an external input, such as a touch input or a multi-touch input, received by the input receiving unit 110.

According to an embodiment, the display unit 130 may display at least one of the date search bar for searching at least one image according to generated dates, and the time search bar for searching images matching each of the generated dates according to generated times. The current embodiment will be described in detail below with reference to FIG. 6.

According to an embodiment, the display unit 130 may display an image selected based on a touch input received from outside the apparatus 100. Also, the display unit 130 may adjust and display the date search bar based on a multi-touch input received by the image determining unit 120 from outside the apparatus 100.

According to another embodiment, the display unit 130 may display additional information about an image on the touch screen. The additional information may include a user memo about an image, a place where the image is captured, and a date and time when the image is captured. If the image displayed on the touch screen is a medical ultrasonic image and the apparatus 100 is an ultrasonic diagnostic apparatus, the display unit 130 may display at least one of measurement information of a target object, diagnostic information, and patient information as the additional information.

The control unit 140 controls the apparatus 100, the input receiving unit 110, the image determining unit 120, and the display unit 130. For example, the control unit 140 may control the image determining unit 120 to change time information or select an image to be displayed based on the external input received by the input receiving unit 110. Alternatively, the control unit 140 may control the display unit 130 to display an image determined by the image determining unit 120 on the touch screen.

Figure 2:
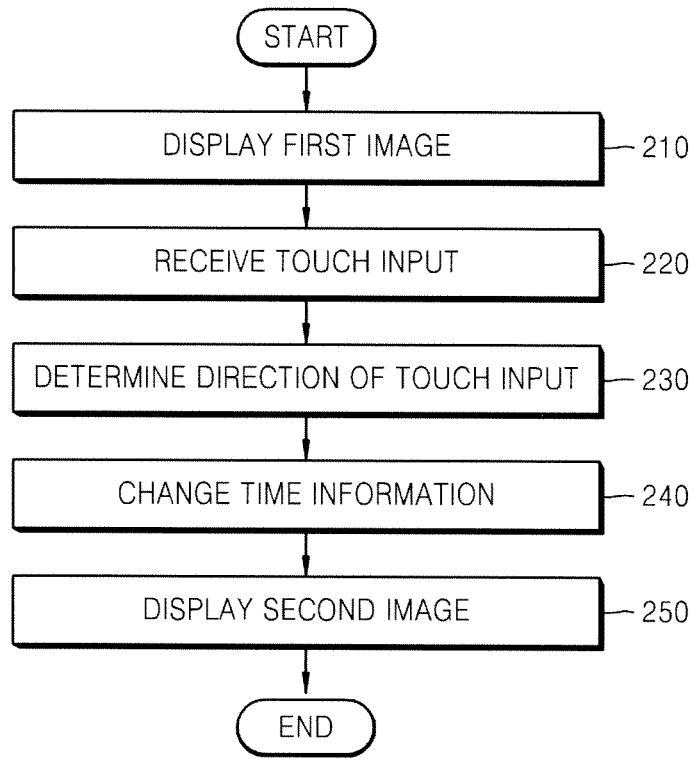
FIG. 2 is a flowchart illustrating a method of displaying an image, according to an embodiment of the present invention.

FIG. 2 is a flowchart illustrating a method of displaying an image, according to an embodiment of the present invention.

In operation 210, the apparatus 100 displays the first image. In other words, the apparatus 100 may display the first image on the touch screen. The first image being displayed matches time information, wherein information about at least one of a generated date and a generated time is matched.

In operation 220, the apparatus 100 receives the touch input. The received touch input may be an input of selecting at least one location on the touch screen. Alternatively, the touch input may be an input of connecting two points on the touch screen, and may include a swipe input, a drag and drop input, and a flick input. In operation 220, the apparatus 100 may include a multi-touch input.

In operation 230, the apparatus 100 determines the direction of the touch input. The apparatus 100 may determine the direction of the touch input based on locations of a starting point and end point of the touch input received through the touch screen, on the touch screen. According to another embodiment, the direction of the touch input may be determined based not only on the locations, but also on a direction of acceleration or input pattern of the touch input.

In other words, according to an embodiment, the apparatus 100 may detect the direction of acceleration of the touch input received through the touch screen, and determine the direction of acceleration as the direction of the touch input. Alternatively, the apparatus 100 may pre-store an input pattern in left, right, up, and down directions, and determine the direction of the touch input by comparing the input pattern and the received touch input.

Operation 230 will now be described in detail.

According to an embodiment, the apparatus 100 may determine the direction of the touch input to be any one of left, right, up, and down directions. For example, when an angle of a straight line connecting the starting and end points of the touch input and a widthwise horizontal line is in a range equal to or higher than 0° and lower than 45°, the apparatus 100 may determine the direction of the touch input to be left or right. Alternatively, when the angle of the touch input and the widthwise horizontal line is in a range from 45° to 90°, the apparatus 100 may determine the direction of the touch input to be up or down.

According to another embodiment, the apparatus 100 may determine the direction of the touch input to be a diagonal direction. In other words, when the angle of the touch input and the widthwise horizontal line is in a range equal to or higher than 0° and lower than 30°, the direction of the touch input may be determined to be left or right, and when the angle is in a range from 60° to 90°, the direction may be determined to be up or down. Furthermore, when the angle is in a range equal to or higher than 30° and lower than 60°, the direction determining module 122 may determine the direction to be any one of a left-up diagonal direction, a left-down diagonal direction, a right-up diagonal direction, and a right-down diagonal direction.

In operation 240, the apparatus 100 changes time information. In other words, the apparatus 100 may change the time information of the first image based on the direction of the touch input determined in operation 230. A process of the apparatus 100 changing the time information will now be described in detail.

The apparatus 100 may change time information matching an image to be displayed, based on the direction of the touch input. In other words, when the direction of the touch input is the first direction, the apparatus 100 may change the date when the first image is generated, and when the touch input is in the second direction, the apparatus 100 may change the time when the first image is generated. Here, the first and second directions may be any one of left, right, up, and down directions, and may be different from each other. The current embodiment is described in detail below with reference to FIG. 5.

In operation 250, the apparatus displays the second image matching the changed time information. In other words, a new image matching at least one of date and time when the new image is generated is displayed based on the time information changed in operation 240.

Figure 3:
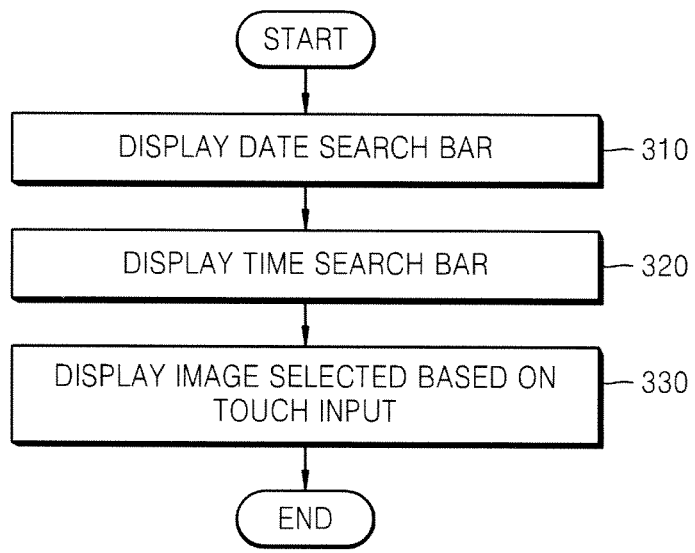
FIG. 3 is a flowchart illustrating a method of displaying an image, according to an embodiment of the present invention.

FIG. 3 is a flowchart illustrating a method of displaying a date search bar and a time search bar on a touch screen, according to an embodiment of the present invention.

In operation 310, the apparatus 100 displays a date search bar for searching at least one image according to generated dates, on the touch screen. The date search bar may indicate a number of at least one image matching each generated date.

In operation 320, the apparatus 100 may display the time search bar for searching an image matching each generated date, according to the generated times. Images matching a date selected in the date search bar may be displayed on the time search bar according to a chronological order.

In operation 330, the apparatus 100 displays an image selected based on the touch input. In other words, an image selected based on a touch input on at least one of the region where the date search bar is displayed and the region where the time search bar is displayed, may be displayed on the touch screen. The current embodiment will be described in detail below with reference to FIG. 6.

Hereinafter, storing and displaying of a plurality of images are described with reference to FIGS. 4 and 5.

Figure 4:
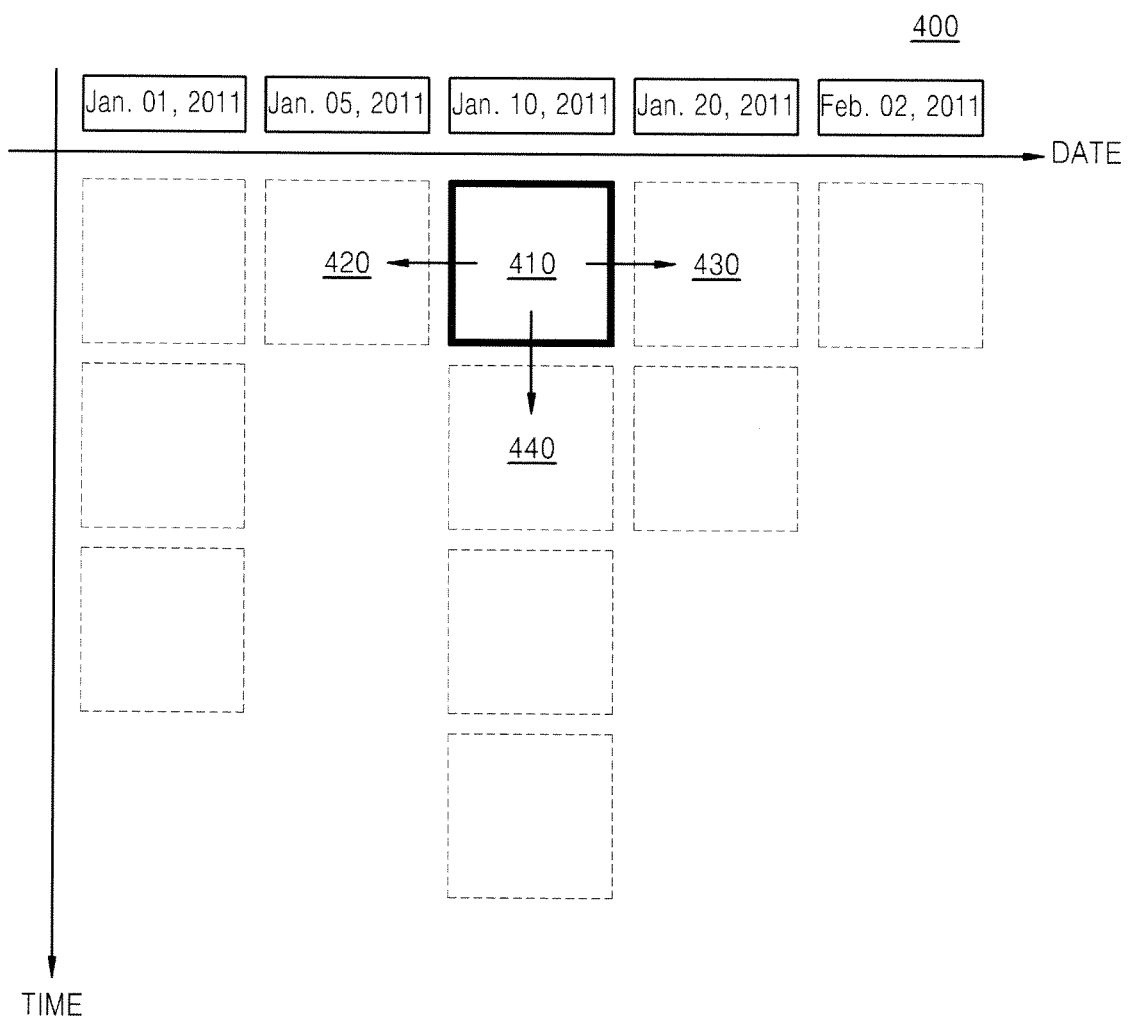
FIG. 4 is a diagram for describing an embodiment of matching a plurality of images and time information.

FIG. 4 is a diagram for describing an embodiment of matching a plurality of images and time information. It would be obvious to one of ordinary skill in the art that a table 400 shown in FIG. 4 does not show actual locations or spaces of the plurality of images, but shows a hypothetical order and arrangement of the images to describe the images matching time information.

Square boxes of the table 400 of FIG. 4 show images 410 through 440 stored in the apparatus 100. In the table 400, a horizontal axis may denote information about dates when the images are captured, and a vertical axis may denote information about times when the images are captured According to an embodiment, the apparatus may display the image 410 in a first chronological order captured on Jan. 10, 2011. As shown in the table 400, the number of boxes shown according to dates may denote the number of images captured in the corresponding date, for example, three images captured on Jan. 1, 2011, one image captured on Jan. 15, 2011, and four images captured on Jan. 10, 2011. Also, a plurality of images captured on the same date may be arranged in the table 400 according to a chronological order based on time information of each image.

In the current embodiment, when the apparatus received a touch input and a direction of the touch input is determined to be "right", a user may expect the image 430 of a next date, i.e., Jan. 20, 2011, from the image 410 currently displayed, to be displayed. Accordingly, the apparatus may change current time information to select time information in a first order of the corresponding date and the next date, i.e., Jan. 20, 2011. Next, the apparatus may display the image 430 corresponding to the date Jan. 20, 2011 at a time in the first order.

On the other hand, when the direction of the touch input is determined to be "left", the apparatus may determine time information in the first order on the previous date Jan. 5, 2011 and the corresponding time, and display the image 420 matching the time information. Similarly, when the direction of the touch input is determined to be "down", the apparatus may display the image 440 matching the time in the second order from among the four images matching the date Jan. 10, 2011.

When the direction of the touch input is determined to be "up", since there is no image matching the time earlier than the image 410 on Jan. 10, 2011, the apparatus may display the image 420 matching the time in the latest order from among images matching the previous date Jan. 5, 2011.

As such, the apparatus 100 may match each of the plurality of images with time information, so as to display an image selected based on the direction of the touch input.

Figure 5:
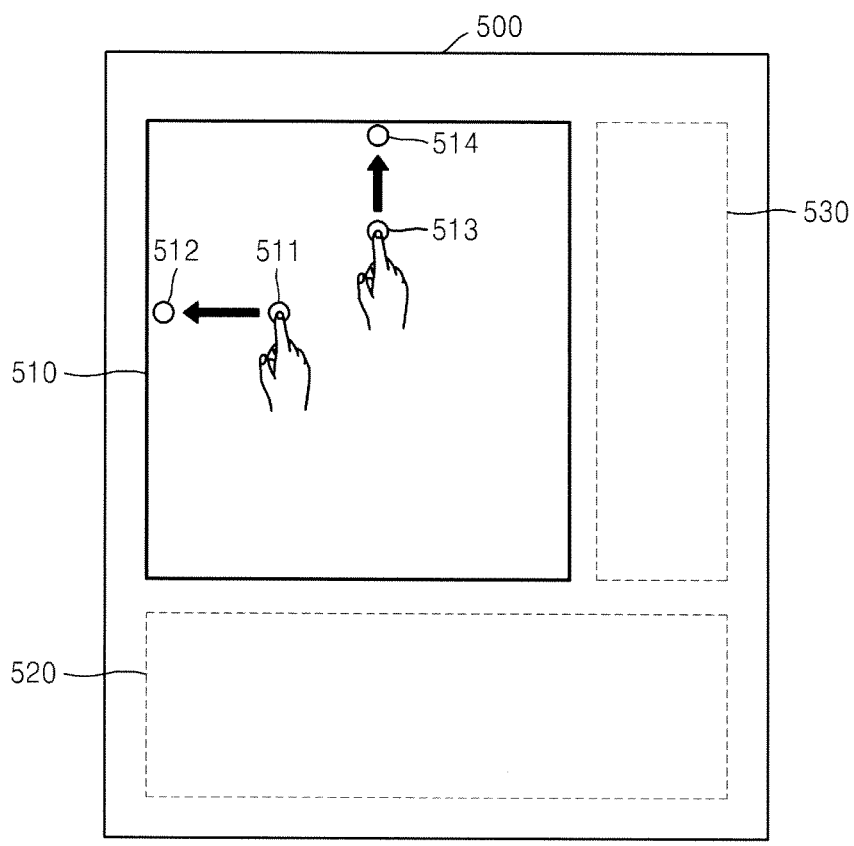
FIG. 5 is a diagram for describing an embodiment of receiving a touch input and displaying an image.

FIG. 5 is a diagram for describing an embodiment of receiving a touch input and displaying an image on a touch screen 500. FIG. 5 will now be described with reference to FIG. 4.

A first region 510 where an image is displayed, a second region 520 where a date search bar is displayed, and a third region 530 where a time search bar is displayed are displayed on the touch screen 500 of FIG. 5. In other words, the apparatus 100 may display an image to be displayed on the first region 510, the date search bar on the second region 520, and the time search bar on the third region 530. The first region 510 of FIG. 5 will be described now in detail, and the second and third regions 520 and 530 will be described later with reference to FIG. 6.

According to an embodiment, the apparatus 100 may display the image 410 of FIG. 4 on the first region 510. Then, the apparatus 100 may receive the touch input through the first region 510 of the touch screen 500. In FIG. 5, cases where the direction of the touch input is "left" and "up" are illustrated.

First, the case when the direction is "left" is described in detail. The apparatus 100 may determine an angle formed by a straight line connecting a starting point 511 and an end point 512 of the touch input received through the first region 510, and a widthwise horizontal line. Then, as described above, when the determined angle is lower than or equal to a predetermined angle, the direction of the touch input is determined to be "left" or "right". In the current embodiment, since the straight line connecting the starting point 511 and the end point 512 is parallel to the widthwise horizontal line, and a location of the starting point 511 is more to the right than a location of the end point 512, the apparatus 100 may determine that the direction of the touch input is "left".

Next, the apparatus 100 may determine a date and time of an image to be newly displayed based on the date, time, and direction of touch input of the image 410 currently displayed. According to an embodiment, the apparatus 100 may determine a new date by changing a date of an image currently displayed, when a direction of a received touch input is "left" or "right". It would be obvious to one of ordinary skill in the art that any one of various algorithms may be used to determine the direction of the touch input.

For example, as shown in FIG. 4, since the previous date of the date Jan. 10, 2011 of the image 410 is Jan. 5, 2011, the apparatus 100 may determine the date matching Jan. 5, 2011. Next, the apparatus 100 may display the image 420 matching the date Jan. 5, 2011.

Alternatively, when there is a plurality of images matching the date Jan. 5, 2011, the apparatus 100 may display an image matching the earliest time from among the images matching the date Jan. 5, 2011. In other words, when the direction of touch input is determined to be "right" in the image 410 currently displayed, the image 430 matching the earliest time from among the two images matching the date Jan. 20, 2011 may be displayed.

Next, the case where the direction of the touch input is "up" will now be described. The apparatus 100 may determine the direction of the touch input based on a starting point 513 and an end point 514 of the touch input received on the first region 510 of the touch screen 500. In other words, in the current embodiment, since the angle of the touch input and the widthwise horizontal line is 90°, i.e., equal to or higher than the predetermined angle, and a location of the starting point 513 is lower than a location of the end point 514, the apparatus 100 may determine that the direction of the touch input is "up".

Next, the apparatus 100 may determine the time information of the image to be newly displayed based on the date, time, and the direction of the touch input of the image currently displayed. In other words, referring to FIG. 4, an image matching a time of a previous order may be selected based on the date (Jan. 10, 2011), time (first order), and the direction (up) of the touch input of the image 410 currently displayed. As shown in FIG. 4, the image 410 from among images matching the date Jan. 10, 2011 is an image matching the earliest order. Thus, the apparatus 100 may display the image 420 matching the time of the latest order from among the images matching the previous date Jan. 5, 2011, instead of an image matching the date Jan. 10, 2011.

According to another embodiment, when the image 440 is currently displayed, the apparatus 100 may display the image 410 matching the time of the previous order from among images matching the same date Jan. 10, 2011, on the first region 510, as the direction of the touch input is determined to be "up".

As such, the apparatus 100 may match and store a plurality of images with dates and times, and display an image based on a touch input. Accordingly, the user may select an image of a desired date and time by simply operating a touch screen.

According to another embodiment, the apparatus 100 may change time information based on any one of various factors, such as a direction of acceleration and an input pattern, besides the location of the touch input. For example, the apparatus 100 may measure a direction of acceleration of a touch input, and determine a direction of the touch input based on an angle of the direction of acceleration and a widthwise horizontal line. Alternatively, the apparatus 100 may determine a direction of a touch input by comparing an input pattern of the touch input with at least one stored pattern.

According to another embodiment, the apparatus 100 may display additional information about an image on a fourth region (not shown) of the touch screen 500. In other words, the apparatus 100 may display a user memo about an image, a place where the image is captured, or a time and date when the image is captured, as the additional information.

In the current embodiment, the apparatus 100 may be an ultrasonic diagnostic apparatus, and a displayed image may be an ultrasonic image. Here, the apparatus 100 may display at least one of measurement information about a measured length or size of a target subject, diagnostic information about an opinion of a user with respect to the target subject, and patient information including personal information, such as name and age of the target subject, as the additional information.

According to the current embodiment, the user may select an image through a simple operation, display additional information related to the corresponding image, and prepare and store a memo about the image.

Figure 6:
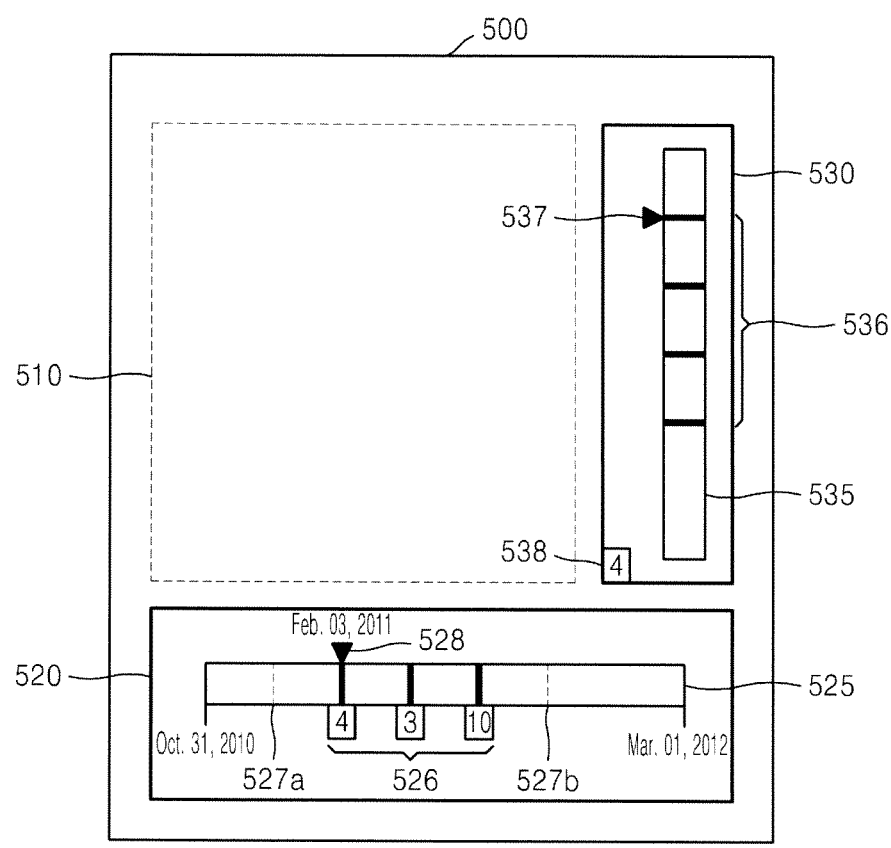
FIG. 6 is a diagram for describing an embodiment of displaying a date search bar and a time search bar.

FIG. 6 is a diagram for describing an embodiment of displaying a date search bar 525 and a time search bar 535.

In the current embodiment, the apparatus 100 may display the date search bar 525 on the second region 520 of the touch screen 500, and the time search bar 535 on the third region 530 of the touch screen 500. In detail, the apparatus 100 may respectively display the date search bar 525 for searching at least one image according to generated dates, and the time search bar 535 for searching an image matching each generated date, according to generated times, on the second region 520 and the third region 530.

The date search bar 525 of FIG. 6 shows a data search section from Oct. 31, 2010 to Mar. 1, 2012. The apparatus 100 may determine a data search section displayed on the data search bar 525 based on dates of the stored images. In other words, when images in a data search section before Oct. 31, 2010 or after Mar. 1, 2012 are stored in the apparatus 100, the apparatus 100 may determine the data search section to be before Oct. 31, 2010 or after Mar. 1, 2012.

Looking at the data search bar 525 of FIG. 6 in detail, the apparatus 100 may separately display a point where the year changes from the date search section of the date search bar 525. In FIG. 6, a point where the year changes from 2010 to 2011 is displayed as a dotted line 527a, and a point where the year changes from 2011 to 2012 is displayed as a dotted line 527b. A point where the year changes may be displayed using any other method, instead of using a dotted line.

According to an embodiment, the apparatus 100 may display the generated dates of the at least one image on the date search bar 525. In other words, the apparatus 100 may display the dates of the images stored during the date search section on the date search bar 525 as thick lines. Also, the apparatus 100 may display the number of images matching each generated date.

In FIG. 6, thick lines 526 are illustrated with numbers 4, 3, and 10. The thick lines 526 may denote that 4, 3, and 10 images were stored on the corresponding dates. Accordingly, the user may easily view distribution of all images by referring to the numbers and thick lines 526 shown on the date search bar 525.

Also, the apparatus 100 may display a date selected via an external input from among a plurality of dates by using a number and/or cursor 528. In other words, when a touch input on a region where the date search bar 525 is displayed is received, the apparatus 100 may display the search date so as to be distinguishable from other dates. Accordingly, the user easily sees distributed locations of dates currently displayed on the touch screen from among the entire date search section.

According to another embodiment of the present invention, the apparatus 100 may adjust the date search section displayed on the date search bar 525 via a multi-touch input received through the touch screen, which will be described in detail below with reference to FIGS. 7A through 7C.

In FIG. 6, the time search bar 535 is displayed on the third region 530 of the touch screen 500. Four images matching the date Feb. 3, 2011 selected via a touch input from the date search section of the date search bar 525 displayed on the second region 520 may be displayed on the time search bar 535 in chronological order. According to the current embodiment, times with respect to the four images may be indicated via thick lines 536.

According to an embodiment, when a selected date is changed based on the touch input received through the date search bar 525, images matching the corresponding date may be changed and displayed on the time search bar 535. In other words, the apparatus 100 may display times of at least one image matching the date determined in the date search bar 525 on the time search bar 535.

According to another embodiment, the apparatus 100 may display the total number of images included in the selected date of the date search section in the data search bar 525 on the time search bar 535. In other words, according to the embodiment of FIG. 6, the time search bar 535 displays a number "4" 538 so that the user may easily determine an overall image distribution matching the date currently selected by the cursor 528.

Referring to FIG. 6, according to another embodiment, the apparatus 100 may display an image matching a determined date and time based on touch inputs on the date search bar 525 and time search bar 535. In other words, the apparatus 100 may select and display an image based on external inputs received by the date search bar 525 and the time search bar 535.

Looking at the current embodiment in detail with reference to FIG. 6, the apparatus 100 may receive a touch input on a number "10" denoting a date when ten images are matched and stored, or on the thick line 526 connected to the number "10", in the date search bar 525. Then, the apparatus 100 may display an image matching a time in the earliest order from among the ten images matching the corresponding date on the first region 510. Then, when the apparatus 100 receives a touch input on the first region 510 in a "down" direction three times, the apparatus 100 may sequentially display images matching times in the second, third, and fourth earliest order from the currently displayed image matching the time in the earliest order from among the ten images, on the touch screen 500.

Similarly for a touch input in a "left" or "right" direction, when the touch input in the "left" direction is received, the apparatus 100 may display an image on a date when three images are stored, which is a previous date to the date when the ten images are matched and stored. According to an embodiment, an image matching a time of the earliest order from among the three images may be displayed.

According to details described with reference to FIGS. 5 and 6, the apparatus 100 may display an image, the date search bar 525, and the time search bar 535 on the touch screen 500, and newly display an image selected by receiving an external input. The user may display a new image by changing a date and time via a simple operation, such as a touch input.

Figure 7A:
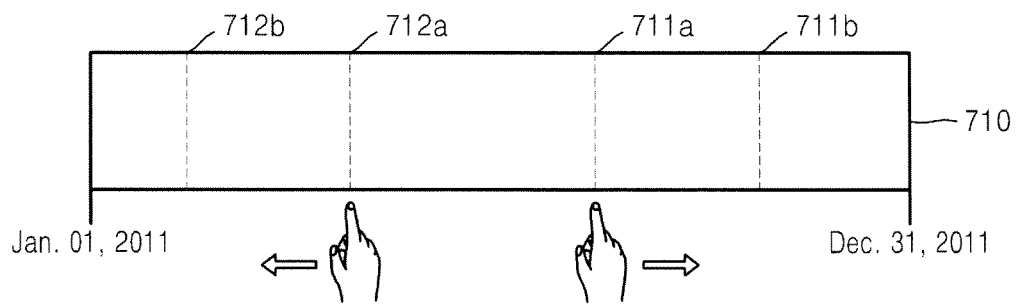
FIGS. 7A through 7C are diagrams for describing embodiments of adjusting a date search bar according to a multi-touch input.
Figure 7B:
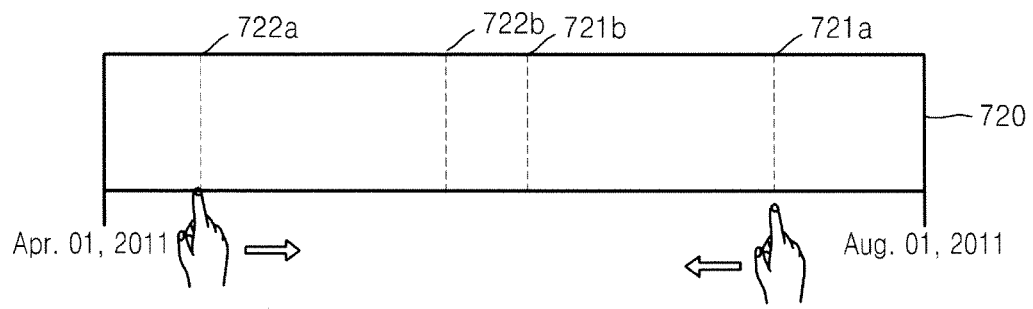
Figure 7C:
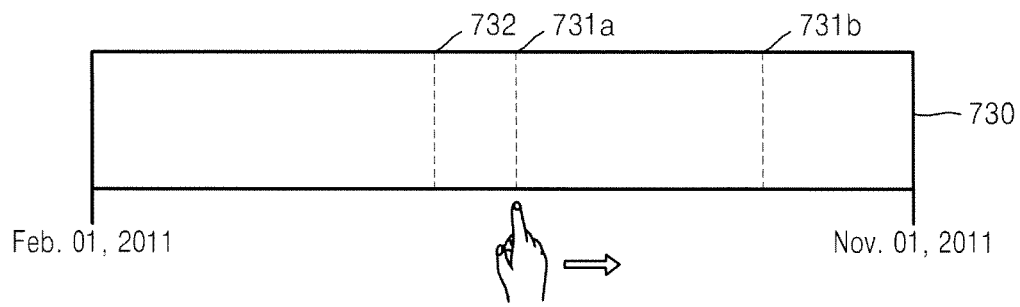

FIGS. 7A through 7C are diagrams for describing embodiments of adjusting a date search bar according to a multi-touch input.

FIG. 7A illustrates a date search bar 710 displayed on the touch screen by the apparatus 100. In the current embodiment, a date search section from Jan. 1, 2011 to Dec. 31, 2011 is displayed in the date search bar 710.

Next, the apparatus 100 may receive a multi-touch input to adjust the date search section and display a new date search section. For example, the apparatus 100 may expand the date search section to the new date search section based on a pinch input.

In detail, a range from a dotted line 711a to a dotted line 712a may be expanded to a range respectively from a dotted line 711b to a dotted line 712b via a multi-touch input. Here, the apparatus may newly determine and display the new date search section from Apr. 1, 2011 to Aug. 1, 2011 based on the multi-touch input. In other words, the date search bar 710 may expand based on the multi-touch input and be displayed on the touch screen, as shown in FIG. 7B.

According to another embodiment, the apparatus 100 may display times of images in the new date search section on a time search bar, with respect to images matching the new date search section determined via the multi-touch input.

In FIG. 7B, contrary to FIG. 7A, the apparatus 100 may receive a multi-touch input on a date search bar 720, and determine a new date search section according to the received multi-touch input. In FIG. 7B, the date search section is adjusted via an unpinch input.

The apparatus 100 may reduce the date search section from Apr. 1, 2011 to Aug. 1, 2011 based on the multi-touch input. In other words, a range from a dotted line 721a to a dotted line 722a may be reduced to a range respectively from a dotted line 721b to a dotted line 722b based on the multi-touch input. The apparatus 100 may determine the new date search section to be from Feb. 1, 2011 to Nov. 1, 2011 based on the multi-touch input. In other words, the date search bar 720 may be reduced based on the multi-touch input and displayed on the touch screen, as shown in FIG. 7C.

Also, the apparatus 100 may determine images matching the new date search section, based on the dotted lines 721b and 722b. Then, the apparatus 100 may display times of the images matching the new date search section on a time search bar.

In FIG. 7C, the apparatus 100 receives a multi-touch input, and a new date search section is determined based on the multi-touch input. In other words, the apparatus 100 may change a current date search section via a received multi-touch input. In detail, a range from a dotted line 731a to a dotted line 732 may be newly determined to be a range from a dotted line 731b to the dotted line 732 via a multi-touch input. In other words, an input of touching the dotted line 732 may be maintained while a multi-touch input of moving the dotted line 731a is received. A new date search section determined via the multi-touch input may be determined to be in a range from Feb. 1, 2011 to Jul. 1, 2011. Like FIGS. 7A and 7B, the apparatus 100 may determine images matching the new date search section, and display times of the images on a time search bar.

According to the apparatus, the method, and a computer-readable recording medium having recorded thereon the method described above, the plurality of images may be conveniently displayed on the touch screen according to dates and times.

Also, the user may search and view the images stored according to various dates and times via a simple operation by using the date search bar and the time search bar, and a mobile device may efficiently display the images on a limited touch screen.

The method and apparatus for a mobile device including a touch screen to efficiently display images by using the touch screen have been provided. Also, a desired image may be quickly searched for and displayed via a simple operation of the user by efficiently displaying images on the touch screen. Furthermore, the user may easily and intuitively search for and display the desired image without having to change a screen on the touch screen.

The embodiments of the present invention may be written as computer programs and may be implemented in general-use digital computers that execute the programs using a computer readable recording medium. Also, a structure of data used in the method may be recorded on the computer readable recording medium by using various methods. Examples of the computer readable recording medium include storage media such as magnetic storage media (e.g., ROM, floppy disks, hard disks, etc.), optical recording media (e.g., CD-ROMs, or DVDs), and storage media such as PC interfaces (e.g., PCI, PCI-express, WiFi, etc.).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of displaying an image on a touch screen, the method comprising:
    displaying a first image to which time information is matched, wherein the time information comprises at least one of a date and a time;
    receiving a touch input on a region displaying the first image;
    changing the date when the direction of the touch input is determined to be a first direction, and changing the time when the direction of the touch input is determined to be a second direction; and
    displaying a second image, wherein the second image is determined based on the changed time information.

2. The method of claim 1, wherein the time information indicates when an image matched the time information is generated.

3. The method of claim 1, wherein the first direction is a left or right direction and the second direction is an up or down direction.

4. The method of claim 1, wherein the direction of the touch input is determined based on at least one of a location of a starting point of the touch input, a location of an end point of the touch input, a direction of acceleration of the touch input, and an input pattern of the touch input.

5. The method of claim 1, wherein the receiving of the touch input so comprises receiving at least one of a swipe input, a drag and drop input, and a flick input.

6. The method of claim 1, further comprising displaying a date search bar for searching at least one image according to generated dates,
    wherein the date search bar displays a number of images matching each of the generated dates.

7. The method of claim 6, further comprising displaying a time search bar for searching the images matching each of the generated dates according to generated times.

8. The method of claim 7, further comprising displaying an image selected based on a touch input on at least one of a region where the date search bar is displayed and a region where the time search bar is displayed.

9. The method of claim 6, wherein the displaying of the date search bar comprises displaying a date selected based on a touch input on a region where the date search bar is displayed, by using at least one of a cursor and a number.

10. The method of claim 6, further comprising expanding or reducing a date search section based on a multi-touch input on a region where the date search bar is displayed.

11. The method of claim 1, performed in an ultrasonic diagnostic apparatus.

12. A non-transitory computer-readable recording medium having recorded thereon a program for executing the method of claim 1.

13. An apparatus for displaying an image on a touch screen, the apparatus comprising:
    a display unit for displaying a first image to which time information is matched, wherein the time information comprises at least one of a date and a time;
    an input receiving unit for receiving a touch input on a region where the first image is displayed; and
    an image determining unit for changing the date when the direction of the touch input is determined to be a first direction, and changing the time when the direction of the touch input is determined to be a second direction,
    wherein the display unit displays a second image determined based on the changed time information if the time information is changed.

14. The apparatus of claim 13, wherein the time information indicates when an image matched the time information is generated.

15. The apparatus of claim 13, wherein the first direction is a left or right direction and the second direction is an up or down direction.

16. The apparatus of claim 13, wherein the direction of the touch input is determined based on at least one of a location of a starting point of the touch input, a location of an end point of the touch input, a direction of acceleration of the touch input, and an input pattern of the touch input.

17. The apparatus of claim 13, wherein the input receiving unit receives at least one of a swipe input, a drag and drop input, and a flick input.

18. The apparatus of claim 13, wherein the display unit displays a date search bar for searching at least one image according to generated dates,
    wherein the date search bar displays a number of images matching each of the generated dates.

19. The apparatus of claim 18, wherein the display unit displays a time search bar for searching the images matching each of the generated dates according to generated times.

20. The apparatus of claim 19, wherein the display unit displays an image selected based on a touch input on at least one of a region where the date search bar is displayed and a region where the time search bar is displayed.

21. The apparatus of claim 18, wherein the display unit displays a date selected based on a touch input on a region where the date search bar is displayed, by using at least one of a cursor and a number.

22. The apparatus of claim 18, wherein the display unit expands or reduces a date search section based on a multi-touch input on a region where the date search bar is displayed.

23. The apparatus of claim 13, being an ultrasonic diagnostic apparatus.

* * * * *